United States Patent [19]

Jorgensen

[11] Patent Number: 4,553,721
[45] Date of Patent: Nov. 19, 1985

[54] SPOILER DEVICE FOR ATTACHMENT TO A LEADING EDGE SLAT

[75] Inventor: Bernard J. Jorgensen, Chatsworth, Calif.

[73] Assignee: Lockheed Corporation, Burbank, Calif.

[21] Appl. No.: 520,796

[22] Filed: Aug. 5, 1983

[51] Int. Cl.$^4$ .................. B64C 9/22; B64C 9/32
[52] U.S. Cl. ..................... 244/213; 244/214
[58] Field of Search .................. 244/213–215, 244/90 R, 90 A, 210, 75 R, 211, 203, 212

[56] References Cited

U.S. PATENT DOCUMENTS

| 1,858,259 | 5/1932 | Alfaro | 244/214 |
| 1,880,967 | 10/1932 | Maxwell, Jr. | 244/211 |
| 1,917,428 | 7/1933 | Burnelli | 244/214 |
| 2,194,796 | 3/1940 | Joyce | 244/213 |
| 2,635,837 | 4/1953 | Grant | 244/90 A |
| 3,282,535 | 11/1966 | Steiner | 244/213 |

FOREIGN PATENT DOCUMENTS

| 419559 | 11/1934 | United Kingdom | 244/210 |
| 530508 | 12/1940 | United Kingdom | 244/213 |

Primary Examiner—Galen L. Barefoot
Attorney, Agent, or Firm—Louis L. Dachs

[57] ABSTRACT

The invention is a spoiler device for an aircraft having a leading edge slat (50) mounted on at least a portion of the leading edge of the wing of the aircraft. A rear portion (52) of the leading edge slat (50) is rotatably mounted thereto and movable from a retracted position to an extended position (52') so as to act as a spoiler. A latch mechanism comprising links 56, 60, 68 and spring member (76) which yieldably hold the rear portion (52) of the slat (50) in the retracted position. An actuator (80) is provided which is mounted to the wing and which is in detachable contact with the latch mechanism of the slat (50). Upon actuation the rear portion (52) is extended and is returned to the retracted portion by the spring member (76). The actuator (80) can be either mechanical, pneumatic, hydraulic or electrical.

5 Claims, 7 Drawing Figures

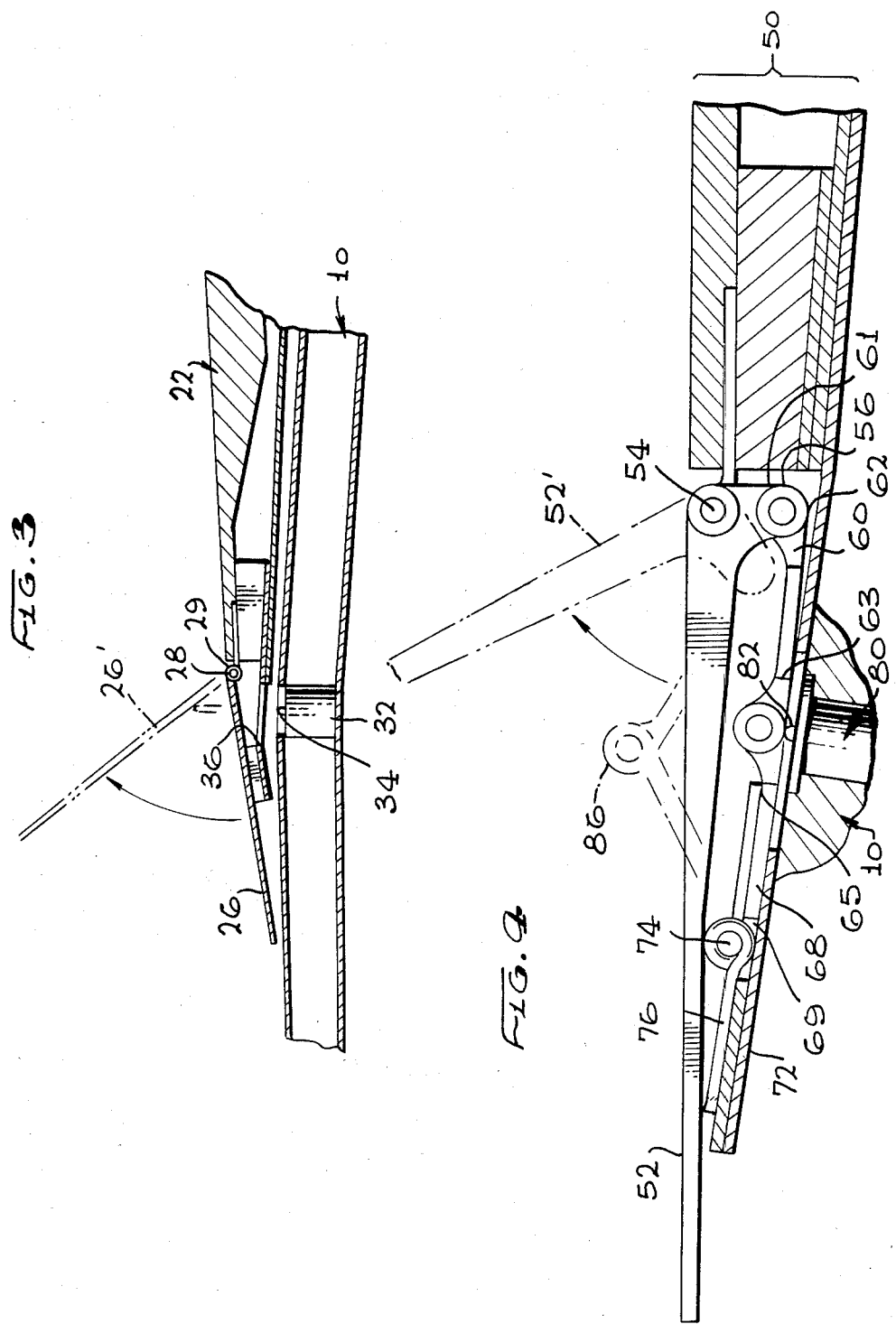

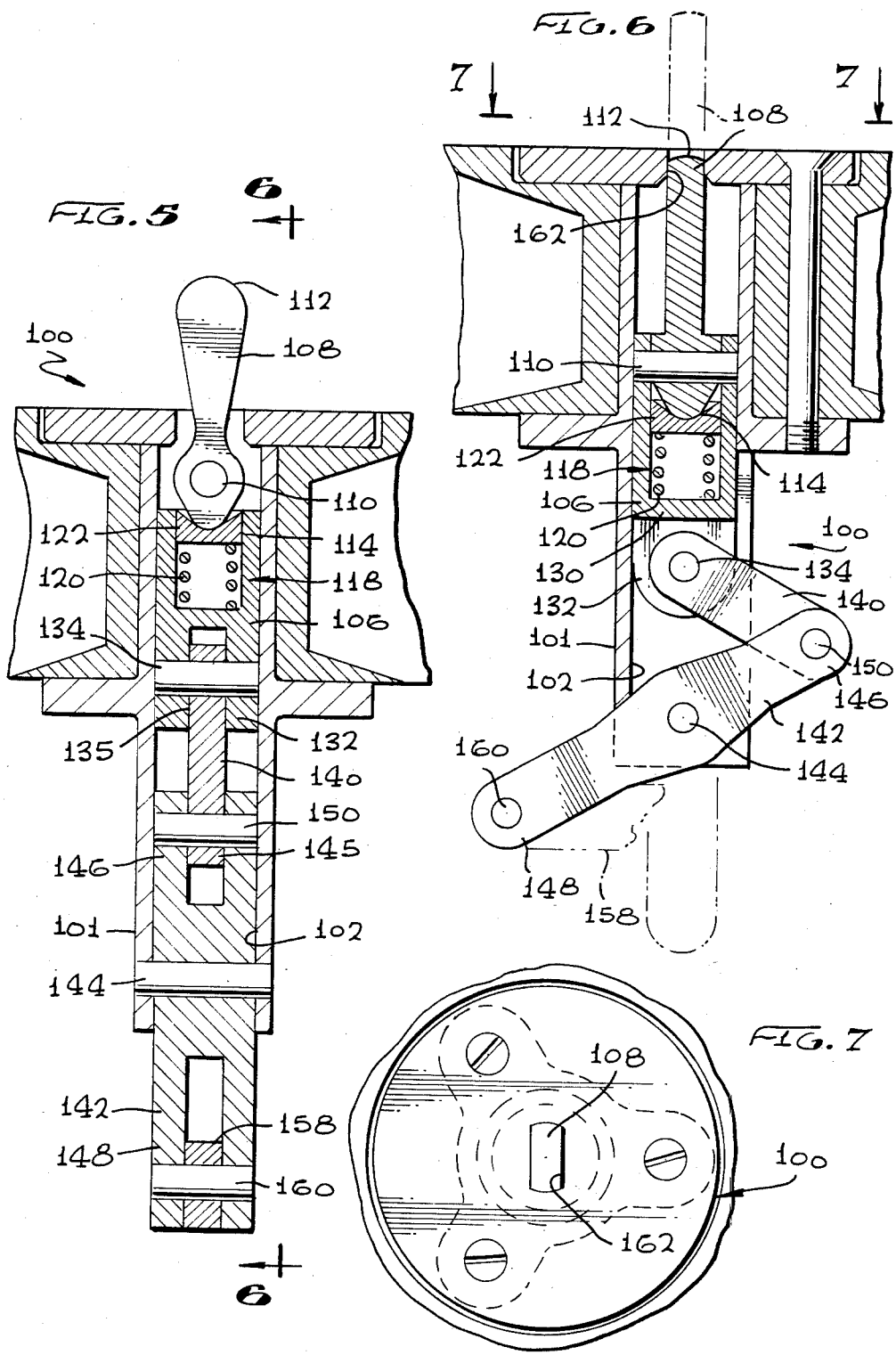

SPOILER DEVICE FOR ATTACHMENT TO A LEADING EDGE SLAT

TECHNICAL FIELD

The invention relates to the field of aerodynamic control surfaces for an aircraft and particularly to an extendable spoiler device for mounting on the wing of the aircraft.

BACKGROUND ART

Most modern transport aircraft, particularly those operating in the high subsonic or transonic range have sweptback wings and include numerous aerodynamic control surfaces. These control surfaces include inboard and outboard ailerons, trailing edge flaps, front opening slaps and spoilers located on the aft portion of the wing in front of the trailing edge flaps. As is well known, the ailerons are used for roll control. The rear mounted flaps and front opening slats are used to increase lift at landing and takeoff. The rear mounted spoilers typically are used to decrease the lift of the air foil during descent. On some aircraft they are used for roll control and during landing they become speed breaks in that they are raised to an almost vertical position. Typically, these control surfaces can provide sufficient aerodynamic control for the entire flight envelope of the aircraft, including takeoff, climb, cruise, maneuvering, descent and landing.

But during certain high speed maneuvers an unusual problem occurs on large wide bodied aircraft which have had their gross weight increased and are flying at higher than normal altitudes. During these maneuvers the outboard portion of the wing can become stalled. Since these aircraft have sweptback wings, the outboard portion of the wing is behind the center of gravity of the aircraft, whereas the inboard portion of the wing is in front of the center of gravity. Thus, if the outboard portion tends to stall, lift is still being produced at the inboard portion in front of the center of gravity and the aircraft tends to pitch up. In the past the approach taken to eliminate this pitch up condition in this particular portion of the flight envelope has been to program into the electronics of the control system movement of the existing control surfaces to dampen out the pitch up or eliminating that portion of the flight envelope altogether. But the complexities of the flight control system are dramatically increased, thus, alternate solutions have been sought. Applicant's solution is to provide a spoiler system to be mounted essentially on the rear portion of the front opening slat which will increase drag and reduce lift on the inboard portion of the wing when extended.

The concept of a front opening slat with a front mounted spoiler is not new. For example, U.S. Pat. No. 2,070,006, "Wing Spoiler," by B. G. Eton, Jr., et al, discloses a front opening slat which is mounted over a leading edge spoiler. The spoiler is mechanically coupled to the ailerons which are both raised simultaneously to spoil lift over the airfoil during landing conditions. This disadvantage of this system is that it cannot be used during high speed flight because the front opening slat must be extended prior to the extension of the front mounted spoiler.

Another example of front mounted spoiler is found in U.S. Pat. No. 2,719,014, "High Lift Airplane With All Moving Tail Unit," by O. C. Koppen. Here the same problem exists, for the spoiler cannot be raised unless the front opening slat is extended.

Other patents of interest are: U.S. Pat. No. 2,631,794, "Air Foil Nose Flap Arrangement," by D. K. Warner; U.S. Pat. No. 4,120,470, "Efficient Trailing Edge System for an Aircraft Wing," by P. C. Whitner (a typical example of a rear mounted spoiler).

In the prior art references, the disadvantage is not only the fact that the spoilers cannot be extended unless the leading edge slat is extended, but also in the fact that their installation on the wing takes up considerable space and furthermore complicates the design of the wing.

Therefore, the primary object of the subject invention to provide a spoiler system for mounting on or near the leading edge of an airfoil.

It is another object of the subject invention to provide a front mounted spoiler which can be easily retrofitted to an existing aircraft.

It is a further object of the subject invention to provide a front mounted spoiler that is integral with the leading edge slat of the aircraft.

DISCLOSURE OF INVENTION

The invention is a spoiler device for an aircraft having a leading edge slat mounted on at least a portion of the leading edge of the wing of the aircraft. A rear portion of the leading edge slat is rotatably mounted thereto and movable from a retracted position to an extended position so as to act as a spoiler. A biasing means is provided which yieldably holds the rear portion of the slat in the retracted position. Actuation means is provided which is mounted to the wing and which is in detachable contact with the rear portion of the slat. Upon actuation the spoiler is extended and is returned to the retracted position by the biasing means. The actuation means can be either mechanical, pneumatic, hydraulic or electrical.

In a second and preferred embodiment the rear portion or spoiler is yieldably held in the retracted position by a linkage mechanism spring biased to the retracted position.

The novel features which are believed to be characteristic of the invention both as to its organization and its method of operation, together with further objects and advantages thereof, will be better understood from the following description in connection with the accompanying drawings in which presently preferred embodiments of the invention are illustrated by way of examples. It is to be expressly understood, however, that the drawings are for purposes of illustration and description only, and are not intended as a definition of the limits of the invention.

BRIEF DESCRIPTION OF DRAWINGS

Illustrated in FIG. 1 is a planform view of the wing of a typical swept winged aircraft.

Illustrated in FIG. 2 is a schematic diagram of a front opening slat in the retracted and extended position showing the position of the front mounted spoiler.

Illustrated in FIG. 3 is a partial view of the leading edge slat with spoiler showing a first embodiment.

Illustrated in FIG. 4 is a cross-sectional view of the leading edge slat showing the rear mounted spoiler in a second embodiment.

Illustrated in FIG. 5 is a cross-sectional view of a preferred mechanical actuation system.

Illustrated in FIG. 6 is a cross-sectional view of the mechanical actuator shown in FIG. 5 along the line 6—6.

Illustrated in FIG. 7 is a top view of the mechanical actuation system illustrated in FIG. 6 along the line 7—7.

BEST MODE OF CARRYING OUT THE INVENTION

Figure 1:
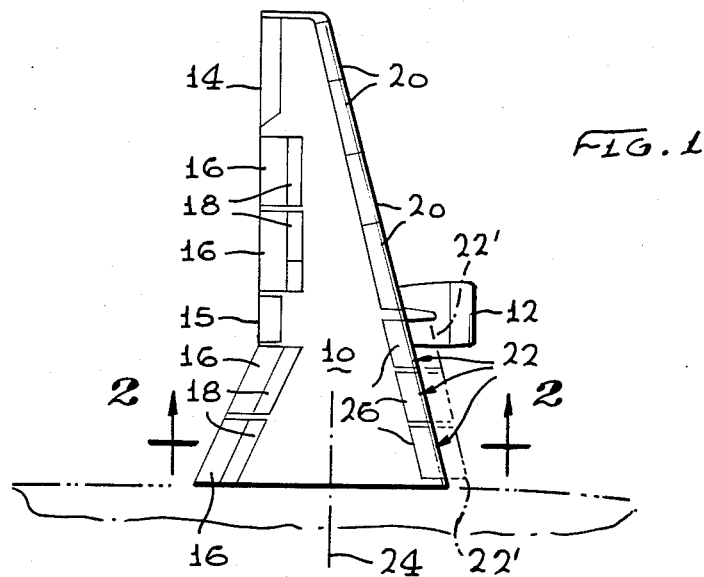

Illustrated in FIG. 1 is a planform view of the wing of a typical transport aircraft. Referring to FIG. 1, it can be seen that the wing, generally designated by numeral 10, has an engine 12 mounted thereon. The wing incorporates outboard and inboard ailerons 14 and 15, respectively, trailing edge flaps 16 and rear mounted spoilers 18. On the leading edge of the wing are outboard mounted extendable slats 20 and inboard mounted extendable slats 22. The center of gravity, indicated by line 24, illustrates the fact that with swept back wings the outboard portion of the wing can be behind the center of gravity while the inboard portion can be in front of the center of gravity. Thus, in the flight conditions, as previously mentioned in the background art section, where the outboard portion of the wing tends to stall and the inboard portion continues to provide lift, the aircraft will tend to pitch up about the center of gravity 24. The subject invention is designed to eliminate this occurrence.

Figure 2:
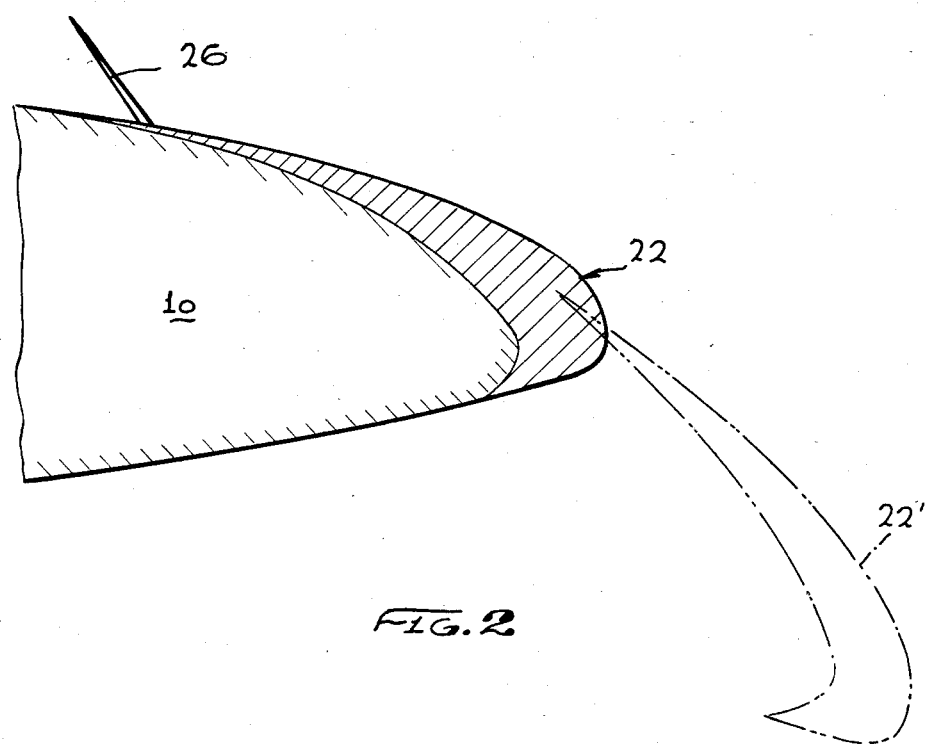

Illustrated in FIG. 2 is a schematic representation of the front opening slat 22 in the retracted and extended position 22′. Referring to FIG. 2 it can be seen that when the slat 22 is in the retracted position the spoiler 26 can be raised disrupting the lift of the inboard portion of the airfoil and increasing drag, while in the extended position, indicated by numeral 22′, the spoiler 26 would be in the retracted position.

Illustrated in FIG. 3 is a cross-sectional view of the rear portion of the front opening slat 22 in cross-section essentially along the line 2—2. It can be seen by viewing FIG. 3 that the leading edge slat 22 has a top rear portion 26 rotatably mounted about a hinge 28. A spring member 29 is mounted at the hinge point and engages the rear portion 26 and biases it toward the retracted position.

An actuator 32 is mounted in the wing 10 having an output probe 34. When the leading edge slat 22 is in the retracted position, as shown, the actuator 32 can be activated extending the probe 34 through an aperture 36 in the slat 22 and into contact with the rear portion 26 moving said rear portion to the extended position (indicated in dotted lines and by numeral 26′). Retraction is accomplished by withdrawing the probe 34 allowing the spring 30 to retract the rear portion 26.

The actuator 32 can be either a pneumatic, hydraulic, electrical powered or mechanically actuated type, whichever is the most convenient to use in the particular aircraft.

Illustrated in FIG. 4 is a second embodiment of the invention and which is again a cross-sectional view along the lines 2—2 shown in FIG. 1. Here the leading edge slat, designated by numeral 50 has a rear portion 52 rotatably mounted thereto having an axis of rotation 54. Attached to the rear portion 52 is a link 56. A second link 60 is rotatably mounted at its first end 62 to the end 61 of the first link 56. The second end 63 of the second link 60 is pivotly connected to the first end 65 of a third link 68, forming a slightly overcenter latch mechanism.

The second end 69 of the third link 68 is rotatably mounted to the bottom slat structure 72 and pivots about an axis of rotation 74. A spring member 76 is adapted to yieldably hold link 68 in the overcenter position, thus locking the rear portion 52 in the retracted position.

Should actuation be required, the actuator 80 can be energized causing a probe 82 to engage the links 60 and 68 overcoming the spring force and causing the links to move to position indicated by numeral 86 (dotted lines). This, in turn, causes the rear portion 52 to move to the extended position indicated by numeral 52′ (in dotted lines). Again, note, the selection of the actuator 80 is a matter of choice.

While it has been previously stated, the selection of the type of actuator is a matter of choice, it is preferred that the actuator be mechanical. Thus, illustrated in FIG. 5 is a cross-sectional view of a preferred mechanical actuator, while illustrated in FIG. 6 is a cross-sectional view of the actuator shown in FIG. 5 along the line 6—6. Illustrated in FIG. 7 is a view looking downward on the actuator shown in FIG. 6 along the line 7—7.

Referring to FIGS. 5-7 it can be seen that the mechanical actuator, generally designated by numeral 100, comprises a hollow housing 101 having an internal bore 102. Slideably mounted within the bore 102 is a guide 106. Pivotly mounted to the guide 106 is a probe 108. The probe 108 is pivotly mounted about a pin 110 mounted in the housing 101 and has a spherical first end 112 and a second end 114 also somewhat spherical in shape.

Mounted within a bore 116 of the guide 106 is a detent generally designated by numeral 118. The detent comprises a spring member 120 biasing a cup shaped member 122 into contact with the end 114 of the probe 108. Thus, the detent 118 tends to hold the probe 108 in axial alignment with the bore 102 of the housing 101.

The end 130 of the guide 106 terminates in a clevis 132, in which is mounted a pin 134. Pivotly attached at it first end 135 to the pin 134 is a link 140. A second link 142 is rotatably mounted to the housing 101 via pin 144 having clevis' 146 and 148 at each end. The second end 145 of link 140 is mounted in the clevis 146 of the link 142 via pin 150. The second end (clevis 148) is coupled to a control cable end 158 via pin 160.

As illustrated in FIG. 6 wherein the actuator 100 is in the retracted position, the probe 108 does not protrude from the housing 101. When the control cable end 158 is actuated, the link is rotated about the pin 144 which in turn drives link 140 and extends the guide 106 so that the probe extends out of the aperture 162 (which limits the amount of rotation of the probe 108) and into contact with the four bar linking causing rear portion 52 to extend.

Finally, while the spoiler device for attachment to leading edge slat has been described with reference to particular embodiments, it should be understood that the embodiments are merely illustrative as there are numerous variations and modifications which may be made by those skilled in the art. Furthermore, while directed at solving a particular problem on large transports, it could well have other applications unknown at this time. Thus, the invention is to be construed as being limited only by the spirit and scope of the appended claims.

Industrial Applicability

The spoiler device for attachment to a leading edge slat has application on aircraft, in particular, large transport aircraft.

I claim:

1. A spoiler device for an aircraft, said aircraft having a leading edge slat mounted on at least a portion of the leading edge of the wing of said aircraft, said slat moveable from a retracted position to an extended position, said spoiler device comprising:

a rear portion of said slat rotatably mounted thereto moveable from a retracted position, to an extended position so as to act as a spoiler;

biasing means adapted to yieldably hold said rear portion of said slat in said retracted position; and actuation means mounted on said wing in detachable contact with said rear portion of said slat, said actuation means adapted to extend said rear portion when said slat is in said retracted position.

2. The spoiler device of claim 1 wherein said biasing means is a spring coupled on one end to said moveable rear portion and on its opposite end to said nonpivoting portion of said spoiler.

3. The spoiler device of claim 2 wherein said actuation means is an actuator selected from the group consisting of mechanical, pneumatic, hydraulic, or electrical actuators having a probe in detachable contact with said rear portion of said slat.

4. A spoiler device for an aircraft, said aircraft having a leading edge slat mounted on at least a portion of the leading edge of the wing of said aircraft, said slat moveable from a retracted position to an extended position, said spoiler device comprising:

a top rear portion of said slat pivotly mounted to said slat having first and second ends;

a bottom rear portion having an aperture therethrough said bottom rear portion rigidly attached to said slat;

a first link having first and second ends, said first end attached to said top rear portion of said slat;

a second link having first and second ends said first end rotatably coupled to said second end of said first link;

a third link having first and second ends said first end of said third link abutting a protrusion on said bottom rear portion of said slat, said second end of said third link pivotly coupled to said second end of said second link;

biasing means coupled between said second and third links causing said links to be in a overcenter relationship preventing movement of said top rear portion; and actuation means mounted to said wing adapted to move said second and third links out of said overcenter relationship and to cause said top rear portion to move to said extended position.

5. A spoiler device of claim 1 or 2 or 3 or 4 wherein said actuation means comprises:

a housing mounted in said wing having an aperture therethrough said aperture having a longitudinal axis;

a guide member moveably mounted within said aperture of said housing;

a probe pivotly mounted to said guide means;

a detent means mounted in said guide member adapted to yieldably hold said probe in alignment with said longitudinal axis of said aperture;

means mounted to said housing to limit the degree of pivoting of said probe;

linkage means rotatably mounted to said housing and coupled to said guide member, said linkage means adapted to move said guide member toward the rear portion causing said probe to contact and move said rear portion to said extended position.

* * * * *